United States Patent
Horie et al.

(10) Patent No.: US 6,967,820 B2
(45) Date of Patent: Nov. 22, 2005

(54) HEAD SUSPENSION FOR DISK DRIVE (75) Inventors: Norio Horie, Yokohama (JP); Itsuro Kikkawa, Yokohama (JP); Hajime Arai, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 333 days.

(21) Appl. No.: 10/195,797

(22) Filed: Jul. 15, 2002

(65) Prior Publication Data
US 2003/0161073 A1  Aug. 28, 2003

(30) Foreign Application Priority Data
Feb. 26, 2002 (JP) .............................. 2002-049215

(51) Int. Cl.[7] .......................... G11B 5/48; G11B 21/16
(52) U.S. Cl. .............................. 360/244.2; 360/245.4
(58) Field of Search ......................... 360/244.2, 245.2, 360/245.3, 245.4, 244.8, 244.5

(56) References Cited

U.S. PATENT DOCUMENTS

| 4,167,765 A | | 9/1979 | Watrous | |
|---|---|---|---|---|
| 6,055,133 A | * | 4/2000 | Albrecht et al. | 360/245.2 |
| 6,721,133 B2 | * | 4/2004 | Takagi et al. | 360/244.8 |
| 6,765,759 B2 | * | 7/2004 | Bhattacharya et al. | 360/244.2 |
| 6,813,119 B2 | * | 11/2004 | Okamoto et al. | 360/245.2 |
| 2001/0008475 A1 | * | 7/2001 | Takagi et al. | 360/244.8 |
| 2003/0161074 A1 | * | 8/2003 | Horie et al. | 360/244.9 |
| 2004/0120076 A1 | * | 6/2004 | Takagi et al. | 360/244.2 |

FOREIGN PATENT DOCUMENTS

| JP | 11-134627 | 5/1999 |
|---|---|---|
| JP | 2001-155458 | 6/2001 |

* cited by examiner

Primary Examiner—William J Klimowicz
(74) Attorney, Agent, or Firm—Jordan and Hamburg LLP

(57) ABSTRACT

A head suspension for a disk drive has a flexure extended from a load beam toward a plate. The flexure is structured to prevent fluttering. The head suspension has the plate attached to a carriage and turned around a spindle, the load beam having a rigid part and a resilient part and supported by the plate with the resilient part adjoining an end of the plate, to apply load on a slider arranged at a front end of the load beam, the flexure having a head to write and read data to and from a hard disk and a conductive path to transmit write and read signals to and from the head, the flexure being attached to the load beam and extended toward the plate, and a fixing piece formed on the flexure. The fixing piece is fixed to a resilient material at the end of the plate.

7 Claims, 10 Drawing Sheets

HEAD SUSPENSION FOR DISK DRIVE

BACKGROUND OF THE INVENTION

1. Field of the Invention

The present invention relates to a head suspension for a disk drive incorporated in an information processing apparatus such as a personal computer.

2. Description of the Related Art

A hard disk drive (HDD) records and reproduces information to and from rotating magnetic or magneto-optical disks. The HDD has a carriage that is turned around a spindle by a positioning motor.

An example of the carriage is disclosed in U.S. Pat. No. 4,167,765. The carriage of this disclosure includes carriage arms, a head suspension attached to a front end of each carriage arm, a head attached to the head suspension, and a slider attached to the head. When the disks are rotated at high speed, the sliders slightly float from the disks, and air bearings are formed between the disks and the sliders.

The head suspension includes a load beam made of a precision thin plate spring, a flexure made of a very thin plate spring fixed to a front part of the load beam by, for example, laser welding, and a plate fixed to a base of the load beam by, for example, laser welding. The plate is fixed to a head suspension fitting face of the carriage arm.

Recent hard disk drives employ high-density disks and drive the disks at high speed. For such high-density disks, the head suspensions must have excellent vibration characteristics to correctly position the heads on recording faces of the disks, as well as characteristics to avoid the influence of air disturbance caused by the disks rotating at high speed. To satisfy such and other requirements, the head suspensions are frequently subjected to intricate processes.

The high-density disks require head suspensions having high rigidity and low spring constants. To meet the requirement, the present inventor proposed in Japanese Patent Laid Open Publication No. 2001-155458 a head suspension 101 of FIG. 17, which is different from a conventional head suspension that employs a load beam composed of an integrated rigid part and resilient part.

Figure 17:
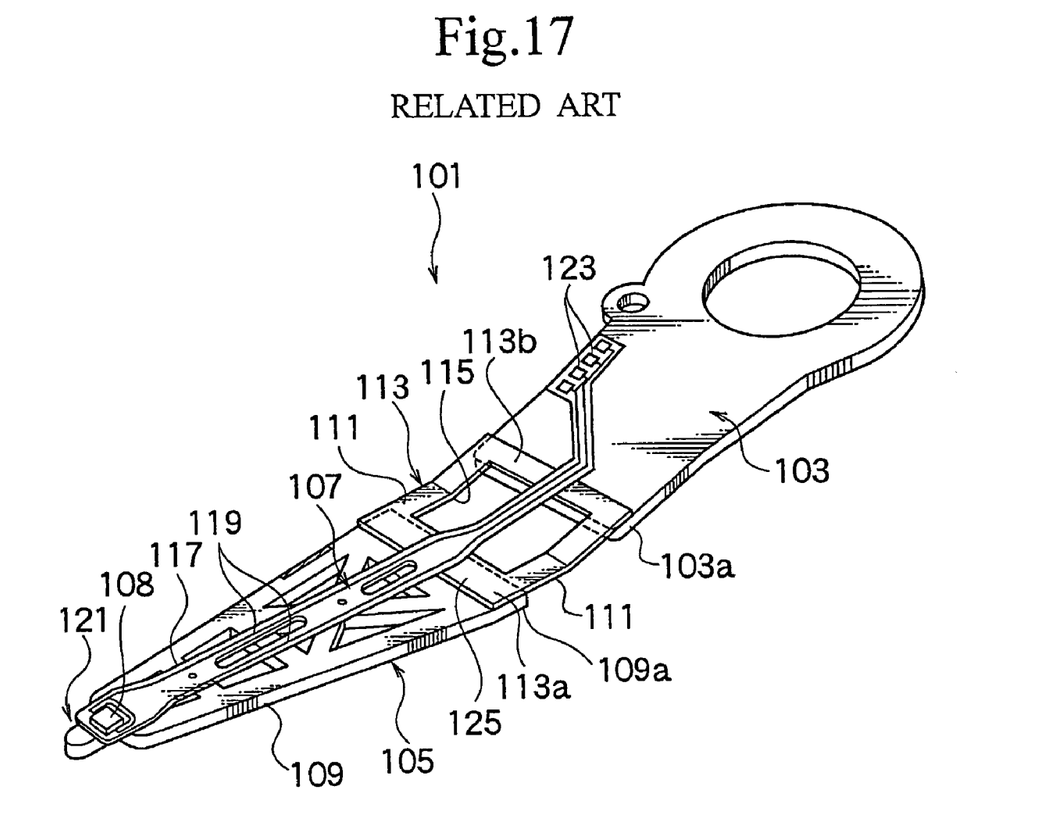
FIG. 17 is a perspective view showing a head suspension according to a related art.

The head suspension 101 of FIG. 17 has a plate 103, a load beam 105, and a flexure 107.

The plate 103 is attached to a carriage arm of a carriage. The carriage drives the head suspension 101 around a spindle.

The load beam 105 applies load on a slider 108 arranged at a front end of the load beam 105. The load beam 105 consists of a rigid part 109 and a resilient part 111. The resilient part 111 is made of a resilient material 113 that is independent of the rigid part 109.

The resilient material 113 is a rectangular plate and has an opening 115 to define the resilient part 111. A first side 113a of the resilient material 113 is laid on an end 109a of the rigid part 109 and is fixed thereto by, for example, laser welding or bonding. A second side 113b of the resilient material 113 is laid on an end 103a of the plate 103 and is fixed thereto by, for example, laser welding or bonding.

The flexure 107 is attached to the rigid part 109 of the load beam 105 by, for example, laser welding and is extended over the resilient material 113 toward the plate 103. The flexure 107 consists of a metal base 117 made of, for example, a resilient thin stainless steel rolled plate, an electric insulating layer formed on the metal base 117, and a conductive path 119 formed in the insulating layer. An end of the conductive path 119 is electrically connected to a terminal of the head 121, and the other end thereof is electrically connected to a terminal 123 for external connection.

In the head suspension 101, the load beam 105 consists of the rigid part 109 and resilient material 113 that are independent of each other. Namely, the rigid part 109 and resilient material 113 may be made of proper materials of their own and may have proper thicknesses of their own, to easily and simultaneously realize required properties such as high rigidity for the rigid part 109 and a low spring constant for the resilient part 111. The resilient part 111 may be made of a precision rolled plate, to provide a stable low spring constant.

The separate rigid part 109 and resilient material 113, however, form an overlapping part 125 between them. Where the flexure 107 rides on the overlapping part 125, contact between the flexure 107 and the load beam 105 deteriorates. This causes a problem that air enters into gaps between the flexure 107 and the rigid part 109, resilient material 113, and plate 103 around the resilient material 113. As a result, when disks are rotated at high speed, air disturbance will flutter the flexure 107 and make the flexure 107 touch the disks to damage the disks and flexure 107.

If the rigid part 109 and resilient material 113 are made integral with each other, there will be no overlapping part 125 on which the flexure 107 rides. Even with such an integrated structure, the flexure 107 must be extended from the rigid part 109 toward the plate 103, and therefore, the flexure 107 will flutter due to air disturbance or asynchronism between the movements of the flexure 107 and resilient part 111.

SUMMARY OF THE INVENTION

An object of the present invention is to provide a head suspension for a disk drive, having a flexure fitted to a load beam and extended toward a plate, capable of suppressing the fluttering of the flexure.

A first aspect of the present invention provides a head suspension for a disk drive, having a plate attached to a carriage and turned around a spindle, a load beam having a rigid part and a resilient part and supported by the plate with the resilient part adjoining an end of the plate, to apply load on a slider arranged at a front end of the load beam, a flexure having a head to write and read data to and from a hard disk and a conductive path to transmit write and read signals to and from the head, the flexure being attached to the load beam and extended toward the plate, and a fixing piece formed on the flexure. The fixing piece is fixed to the plate at the end of the plate.

In the head suspension based on the first aspect, a second aspect of the present invention forms the fixing piece on each longitudinal side of the flexure.

In the head suspension based on any one of the first and second aspects, a third aspect of the present invention linearly extends the flexure from the load beam at least to the end of the plate along a longitudinal center line of the load beam.

In the head suspension based on any one of the first to third aspects, a fourth aspect of the present invention forms the resilient part of the load beam from a resilient material that is independent of the rigid part, lays and joins a first side of the resilient material on an end of the rigid part, and joins a second side of the resilient material to the plate.

According to the first aspect, the plate is attached to a carriage and is turned by the carriage around a spindle. The load beam has the rigid part and resilient part and is supported by the plate, to apply load on the slider arranged at a front end of the load beam. The plate is turned to move the slider of the load beam between tracks on a hard disk.

The fixing piece of the flexure is fixed to the end of the plate. Namely, the flexure is fixed as close to the resilient material as possible. As a result, the flexure is correctly synchronized with the movement of the resilient part, thereby preventing the fluttering of the flexure.

In addition to the effects of the first aspect, the second aspect forms the fixing piece on each longitudinal side of the flexure, to secure the flexure and surely suppress the fluttering of the flexure.

In addition to the effects of the first and second aspects, the third aspect linearly extends the flexure from the load beam at least to the end of the plate along a longitudinal center line of the load beam. This arrangement, with the securing effect of the fixing pieces, maintains a well-balanced state of the flexure from the load beam at least to the end of the plate.

The third aspect simultaneously realizes excellent vibration characteristics to precisely position the head on a recording face of a disk, as well as characteristics to avoid the influence of air disturbance caused when disks are rotated at high speed.

In addition to the effects of the first to third aspects, the fourth aspect forms the resilient part of the load beam from a resilient material that is independent of the rigid part, lays and joins a first side of the resilient material on an end of the rigid part, and joins a second side of the resilient material to the plate. As a result, the rigid part and resilient part may be made of proper materials of their own and may have proper thicknesses of their own, to easily and simultaneously realize required properties such as high rigidity for the rigid part and a low spring constant for the resilient part. The resilient part may be made of a precision rolled plate, to provide a stable low spring constant.

The rigid part and resilient material are independent of each other, and therefore, they may form an overlapping part. Even if the flexure rides on the overlapping part, the fixing pieces of the flexure are fixed to the end of the plate, to secure the flexure adjacent to the resilient part. When disks are rotated at high speed, air may penetrate between the flexure and the rigid part, resilient material, and plate. Even under this state, the flexure hardly flutters and does not touch the surfaces of the disks.

DETAILED DESCRIPTION OF EMBODIMENTS (First Embodiment)

Figure 1:
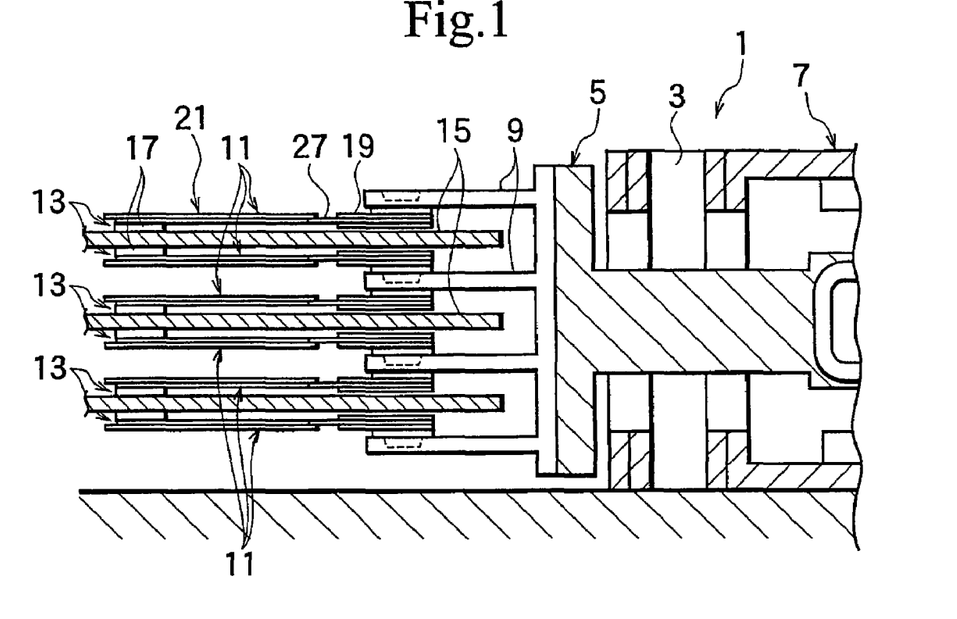
FIG. 1 is a sectional view partly showing a hard disk drive incorporating head suspensions according to a first embodiment of the present invention.

FIG. 1 is a sectional view partly showing a hard disk drive employing head suspensions according to the first embodiment of the present invention. The hard disk drive 1 has a carriage 5 to be turned around a spindle 3.

The carriage 5 is driven around the spindle 3 by a positioning motor 7 such as a voice coil motor. The carriage 5 has a plurality (four in FIG. 1) of carriage arms 9. Each carriage arm 9 has the head suspension 11 at a front end thereof. A front end of the head suspension 11 has a head 13. The carriage 5 is turned around the spindle 3, to move the head 13 to a target track on a disk 15.

The head 13 is used to write and read data to and from the disk 15 and includes a slider 17 facing tracks on the disk 15 and a transducer (not shown) supported with the slider 17. When the disk 15 is rotated at high speed, air enters between the disk 15 and the slider 17 to slightly float the slider 17 from the disk 15 and form an air bearing between the disk 15 and the slider 17.

Figure 2:
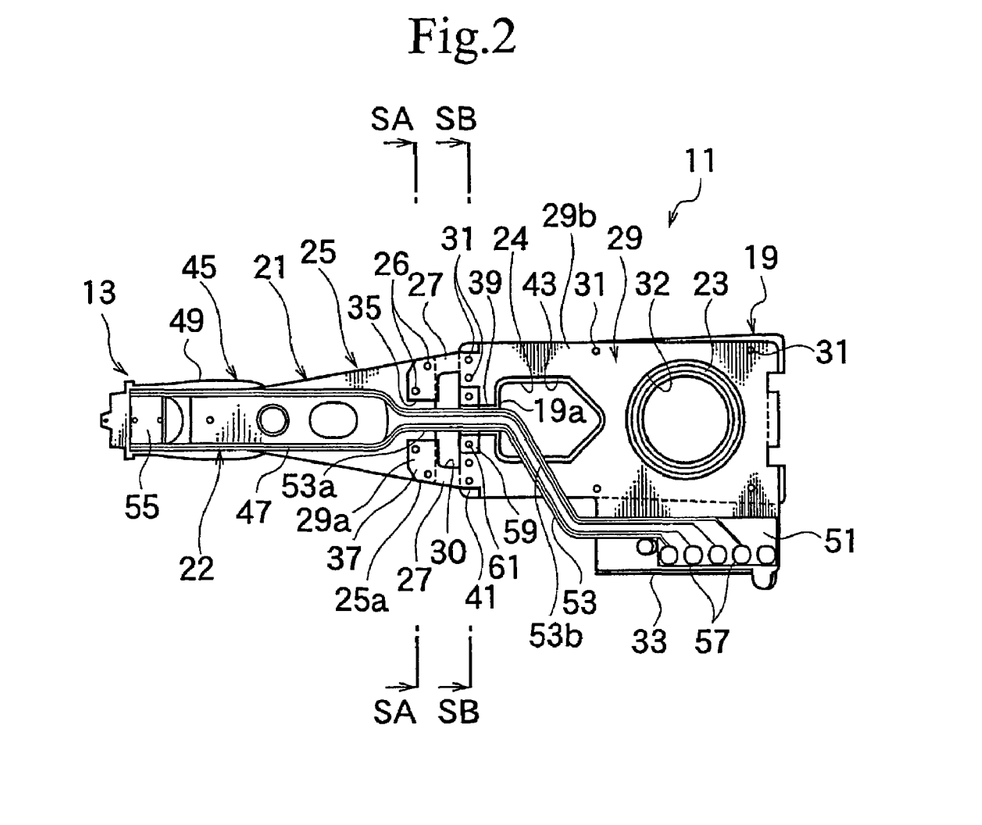
FIG. 2 is a plan view showing the head suspension of the first embodiment seen from a flexure side.
Figure 3:
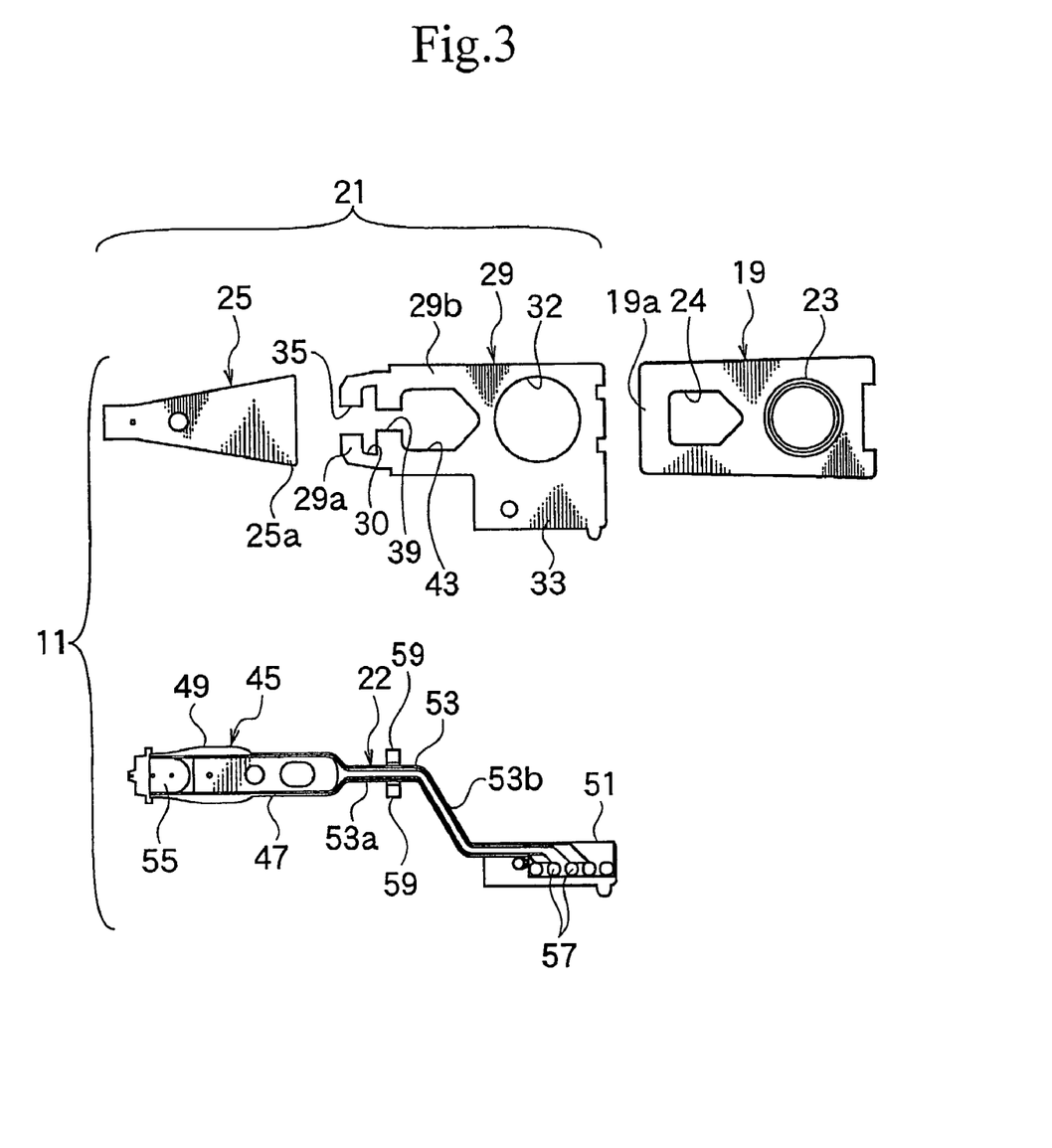
FIG. 3 is an exploded plan view showing the head suspension of the first embodiment.

FIG. 2 is a plan view showing the head suspension 11 according to the first embodiment seen from a flexure side and FIG. 3 is an exploded plan view showing the head suspension 11. The head suspension 11 has a plate 19, a load beam 21, and a flexure 22.

The plate 19 is attached to the carriage arm 9 of the carriage 5 (FIG. 1) and is driven by the carriage 5 around the spindle 3. The plate 19 is made of, for example, a rectangular stainless steel plate. According to the first embodiment, the thickness of the plate 19 is, for example, 200 μm. The plate 19 has a boss 23 and a through window 24 adjacent to an end 19a where a resilient material (to be explained later) is fixed.

The load beam 21 applies load on the slider 17 (FIG. 1) arranged at a front end thereof. The load beam 21 includes a rigid part 25 and a resilient part 27. The resilient part 27 is made of the resilient material 29 that is independent of the rigid part 25.

The rigid part 25 is made of, for example, stainless steel. The rigid part 25 may be made of an alloy of light metal (metal lighter than Fe) such as aluminum (Al) and titanium (Ti), or synthetic resin, to simultaneously realize lightness and rigidity for the head suspension 11. The rigid part 25 may be made of a composite material (clad material) consisting of two or more layers of light metal such as aluminum and titanium or an alloy of the light metal and other metal such as stainless steel.

The resilient material 29 is substantially rectangular and extends from the plate 19 to the rigid part 25. The resilient material 29 is made of, for example, resilient thin stainless steel and has a precision low spring constant lower than that of the rigid part 25.

The resilient material 29 has an opening 30 between a first side 29a and a second side 29b. The opening 30 is made by, for example, etching or precision pressing and sets the resiliency of the resilient part 27. Namely, the opening 30 partly reduces the bending rigidity (spring constant) of the resilient material 29 and forms the resilient part 27 serving as a hinge between the plate 19 and the rigid part 25.

The first side 29a of the resilient material 29 is laid on an end 25a of the rigid part 25 and is fixed thereto by, for example, welding (such as laser welding) 26 or bonding. The second side 29b of the resilient material 29 corresponds to the plate 19 and is generally laid over the plate 19. The second side 29b of the resilient material 29 is fixed to an end 19a and other part of the plate 19 by, for example, welding (such as laser welding) 31 or bonding.

The resilient material 29 has a fitting hole 32, which is concentric with the boss 23 of the plate 19. On one side of the fitting hole 32, the resilient material 29 has a support 33 to support a terminal (to be explained later) of the flexure 22.

Figure 4:
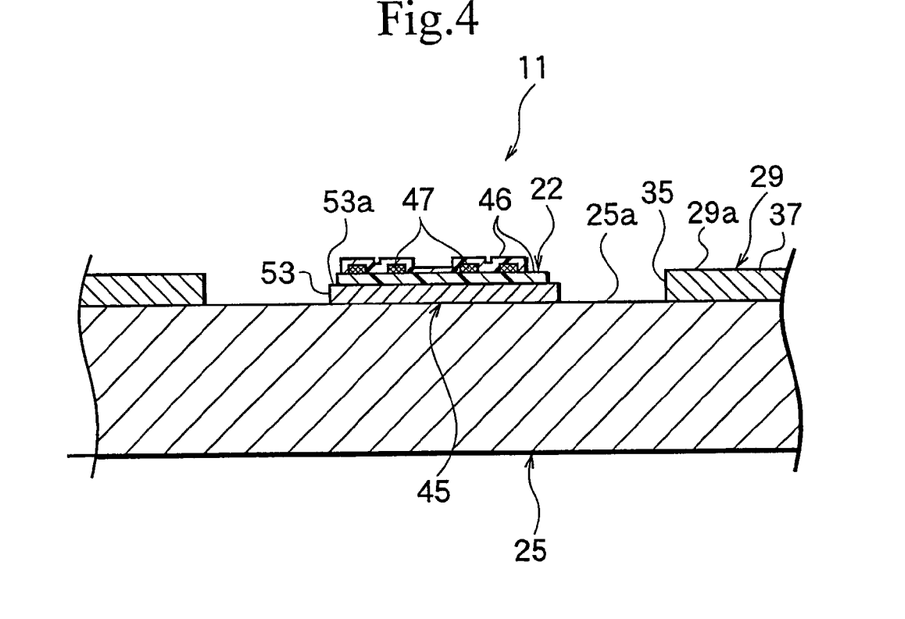
FIG. 4 is a sectional view taken along a line SA—SA of FIG. 2.

Referring to FIGS. 2, 3, and 4, which is a sectional view taken along a line SA—SA of FIG. 2, the first side 29a of the resilient material 29 has a first cut 35. At an overlapping part 37 where the first side 29a of the resilient material 29 overlaps the end 25a of the rigid part 25, the first cut 35 exposes the end 25a. According to the first embodiment, the first cut 35 is substantially at the lateral (vertical in FIGS. 2 and 3) center of the resilient material 29 and is continuous to the opening 30. The width of the first cut 35 is wider than a part of the flexure 22 passed through the first cut 35.

Figure 5:
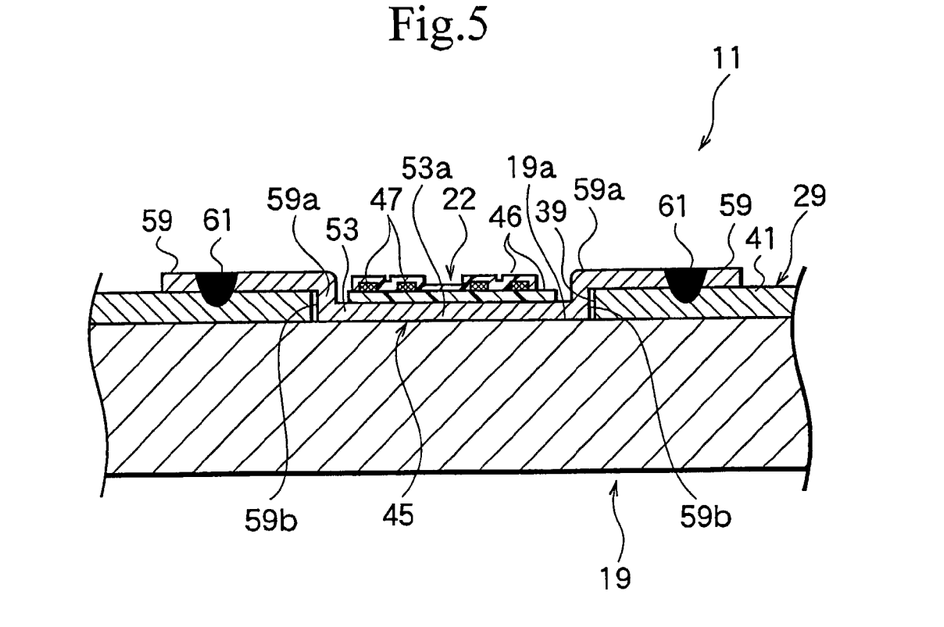
FIG. 5 is a sectional view taken along a line SB—SB of FIG. 2.

Referring to FIGS. 2, 3, and 5, which is a sectional view taken along a line SB—SB of FIG. 2, the second side 29b of the resilient material 29 has a second cut 39. At an overlapping part 41 where the second side 29b of the resilient material 29 overlaps the end 19a of the plate 19, the second cut 39 partly exposes the end 19a. The second cut 39 is substantially at the lateral (vertical in FIGS. 2 and 3) center of the resilient material 29 and is continuous to the opening 30 and first cut 35. The width of the second cut 39 is slightly wider than a part of the flexure 22 passed through the second cut 39. The second cut 39 is connected to an enlarged part 43. The enlarged part 43 corresponds to the window 24 of the plate 19 in shape and size. Namely, the enlarged part 43 extends the second cut 39 onto the window 24.

The flexure 22 consists of a metal base 45 made of, for example, a resilient thin stainless steel rolled plate, an electric insulating layer 46 formed on the metal base 45, and a conductive path 47 formed in the insulating layer 46.

The metal base 45 consists of a front 49, a rear 51, and a middle 53. The front 49 has a tongue 55 to which the slider 17 (FIG. 1) of the head 13 is attached. The front 49 is linear. The rear 51 has a terminal 57 for external connection. The middle 53 is narrower than the front 49 and rear 51 and consists of a linear part 53a and a deflecting part 53b. The linear part 53a is continuous to the front 49. The deflecting part 53b deflects from the window 24. Namely, the deflecting part 53b deflects sideward from the linear part 53a so that the rear 51 may deviate from the front 49.

According to the first embodiment, fixing pieces 59 protrude from an intermediate location of each side of the linear part 53a. The fixing piece 59 may be formed on only one side of the linear part 53a. The fixing pieces 59 are integral with the metal base 45. A base 59a of each fixing piece 59 vertically rises from the metal base 45 for the thickness of the resilient material 29, and then, the fixing piece 59 is bent in the direction of the surface of the metal base 45. Consequently, the fixing pieces 59 are in contact with the resilient material 29 at the end 19a of the plate 19, and the bases 59a and linear part 53a are received in the second cut 39.

An end of the conductive path 47 is electrically connected to a terminal of the head 13, and the other end thereof is electrically connected to the terminal 57 for external connection.

The front 49 of the metal base 45 of the flexure 22 is arranged at the lateral center of the rigid part 25 and is fixed thereto by, for example, laser welding or bonding. The rear 51 of the metal base 45 of the flexure 22 is arranged on the support 33 of the resilient material 29 and is fixed thereto by, for example, laser welding or bonding. At the middle 53 of the metal base 45 of the flexure 22, an outer face 59b of the base 59a of each fixing piece 59 is restricted and positioned by the second cut 39, and the fixing pieces 59 are fixed to the resilient material 29 by, for example, welding (such as laser welding) 61 or bonding.

In this way, the flexure 22 extends through the lateral (vertical in FIGS. 2 and 3) center of the load beam 21. Namely, the flexure 22 linearly runs along the rigid part 25, first cut 35, and second cut 39, reaches the window 24 of the plate 19, and deflects from the window 24 toward the rear 51.

The linear part 53a of the metal base 45 of the flexure 22 is received in the first cut 35, passes through the opening 30, and reaches the second cut 39. At the linear part 53a, the flexure 22 is received in the second cut 39. The fixing pieces 59 are fixed to the resilient material 29. As explained above, the base 59a of each fixing piece 59 is bent in advance, so that the linear part 53a may be received in the second cut 39.

The deflecting part 53b of the flexure 22 rides on the resilient material 29 on one side of the plate 19. The start of the deflecting part 53b is on the window 24 and in the enlarged part 43 of the second cut 39.

According to the first embodiment, the flexure 22 is provided with the fixing pieces 59, which are fixed to the end 19a of the plate 19.

The fixing piece 59 is formed on each longitudinal side of the flexure 22.

The flexure 22 linearly runs along a longitudinal center line of the load beam 21 at least to the end 19a of the plate 19.

The resilient part 27 of the load beam 21 is made of the resilient material 29 that is independent of the rigid part 25. The first side 29a of the resilient material 29 is laid on the end 25a of the rigid part 25 and is joined thereto. The second side 29b of the resilient material 29 is joined to the plate 19.

The head suspension 11 is fitted to the carriage arm 9 by plastically deforming the boss 23 in a radial direction.

The plate 19 is turned by the carriage 5 around the spindle, and the load beam 21 applies load on the slider 17 arranged at the front end of the load beam 21. The plate 19 is turned to move the slider 17 of the load beam 21 between tracks on the disk 15.

In the head suspension 11, the load beam 21 is made of the rigid part 25 and resilient material 29 that are independent of each other. As a result, the rigid part 25 and resilient material 29 may be made of their own proper materials and may have their own proper thicknesses, to easily and simultaneously realize required properties such as rigidity for the rigid part 25 and a low spring constant for the resilient part 27. The resilient part 27 may be made of a precision rolled material to provide a stable low spring constant.

According to the first embodiment, the fixing pieces 59 of the flexure 22 are fixed at the end 19a of the plate 19. Namely, the flexure 22 is fixed as close to the resilient part 27 as possible. This arrangement enables the flexure 22 to correctly synchronize with the movement of the resilient part 27 and surely suppresses the fluttering of the flexure 22.

The fixing pieces 59 protrude from the longitudinal sides of the flexure 22, respectively, to fix the flexure 22. As a result, the flexure 22 is correctly synchronized with the movement of the resilient part 27 and is surely prevented from fluttering.

The flexure 22 linearly extends along a longitudinal center line of the load beam 21, passes over the end 19a of the plate 19 adjacent to the resilient part 27, and reaches the window 24. This arrangement, with the securing effect of the fixing pieces 59, maintains a well-balanced state of the flexure 22 from the load beam 21 to the end 19a of the plate 19. This simultaneously realizes excellent vibration characteristics to precisely position the head 13 on a recording face of a disk and characteristics to avoid the influence of air disturbance caused when disks are rotated at high speed.

According to the first embodiment, the flexure 22 never rides on the overlapping part 37 of the rigid part 25 and resilient material 29, and therefore, no gap is formed between the flexure 22 and the rigid part 25. The flexure 22 is received in the first cut 35, and therefore, never protrudes from the overlapping part 37. The flexure 22 is also received in the second cut 39, and therefore, never protrudes from the overlapping part 41. With this arrangement and the fixation by the fixing pieces 59, the linear part 53a of the flexure 22 is secured to the rigid part 25 and plate 19. The flexure 22 at the linear part 53a is correctly synchronized with the movement of the resilient part 27, and no air penetrates between the linear part 53a and the rigid part 25 and plate 19. This prevents the influence of air disturbance on the flexure 22 when the disks 15 are rotated at high speed. Consequently, the fluttering of the flexure 22 is surely prevented.

Figure 6:
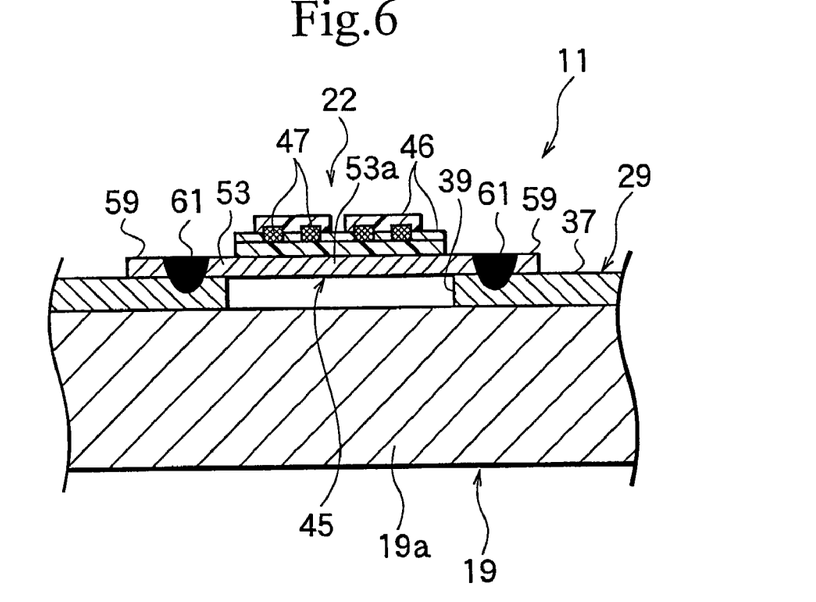
FIG. 6 is a sectional view corresponding to FIG. 5, showing a modification of the first embodiment.

The first embodiment arranges the flexure 22 in the second cut 39 at the linear part 53a of the middle 53 of the metal base 45 of the flexure 22. The flexure 22 may be modified as shown in FIG. 6. FIG. 6 shows a flexure 22 according to a modification of the first embodiment and corresponds a sectional view taken along the line SB—SB of FIG. 2. In FIG. 6, the flexure 22 has fixing pieces 59 that are integral with a metal base 45 of the flexure 22 and horizontally protrude therefrom. A middle 53 of the flexure 22 includes a linear part 53a that is positioned on the second cut 39.

(Second Embodiment)

Figure 7:
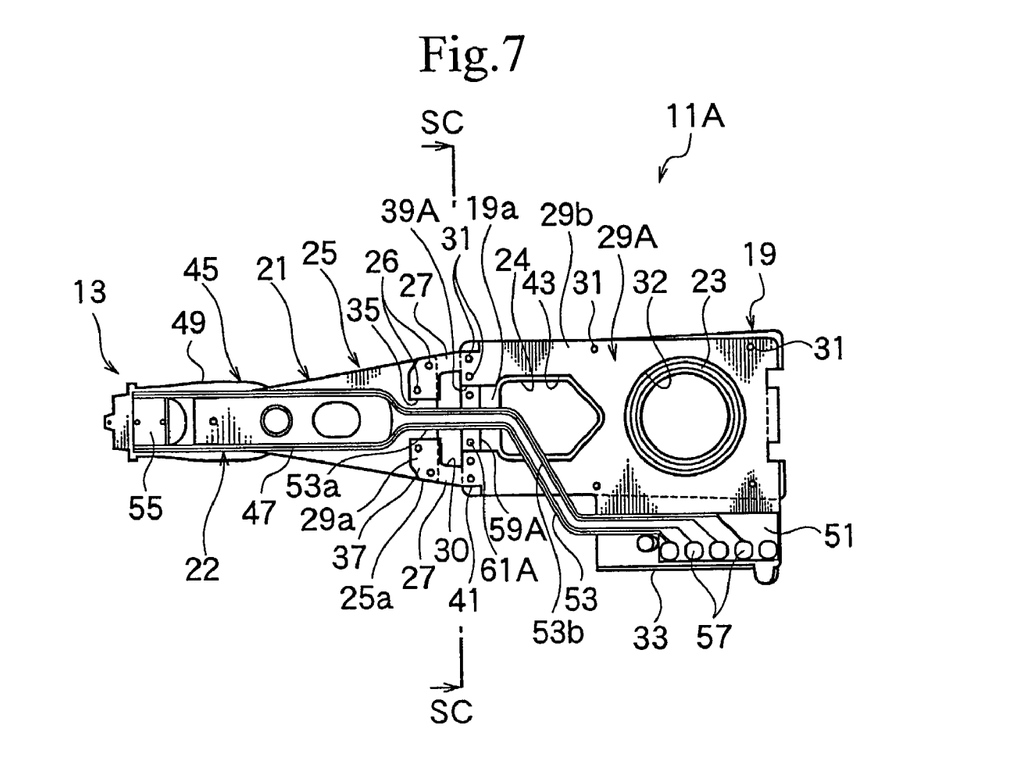
FIG. 7 is a plan view showing a head suspension according to a second embodiment of the present invention seen from a flexure side.
Figure 8:
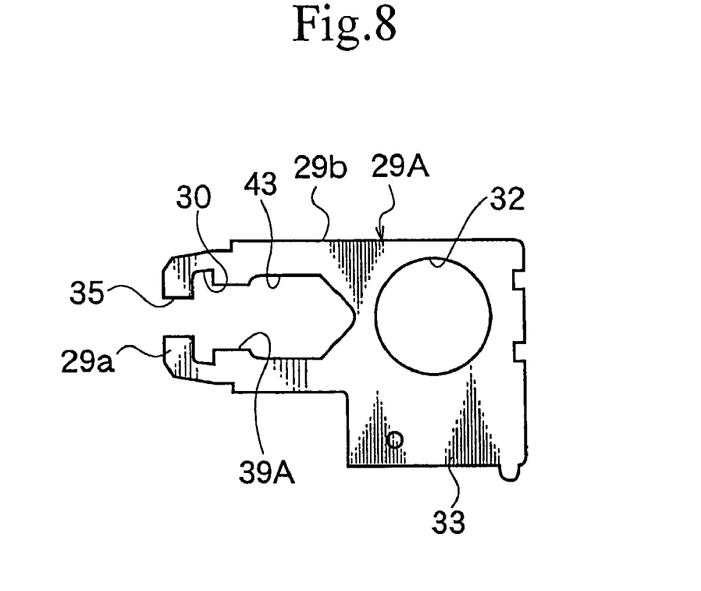
FIG. 8 is a plan view showing a resilient material according to the second embodiment.
Figure 9:
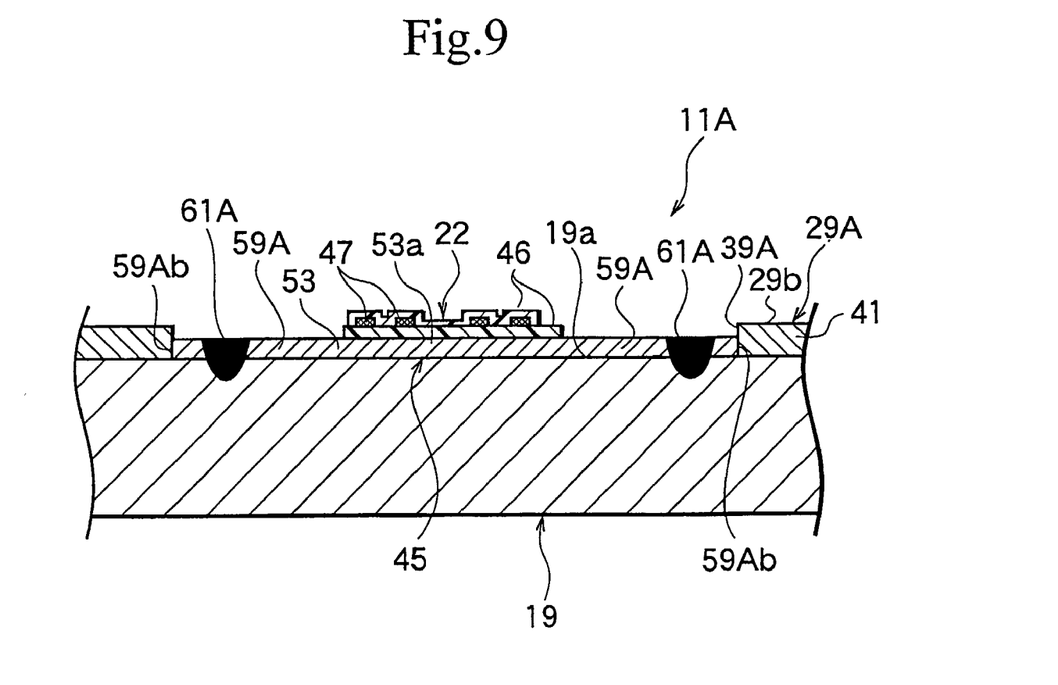
FIG. 9 is a sectional view taken along a line SC—SC of FIG. 7.

FIG. 7 is a plan view showing a head suspension 11A according to the second embodiment of the present invention seen from a flexure side, FIG. 8 is a plan view showing a resilient material 29A according to the second embodiment, and FIG. 9 is a sectional view taken along a line SC—SC of FIG. 7. The second embodiment is basically the same as the first embodiment, and therefore, parts corresponding to those of the first embodiment are represented with like reference numerals.

The second embodiment forms a second cut 39A of the resilient material 29A wider than the second cut 39 of the first embodiment. The width of the second cut 39A is determined according to a tip-to-tip distance of fixing pieces 59A of a flexure 22. The fixing pieces 59A flatly protrude from a metal base 45 of the flexure 22 and are secured to an end 19a of a plate 19.

In FIGS. 7 and 9, the fixing pieces 59A are received in the second cut 39A and are fixed to the end 19a of the plate 19 by, for example, welding (such as laser welding) 61A or bonding.

Like the first embodiment, the flexure 22 has the fixing pieces 59A, which are fixed to the end 19a of the plate 19.

The fixing piece 59A is formed on each longitudinal side of the flexure 22.

The flexure 22 is linearly extended along a longitudinal center line of a load beam 21 toward the end 19a of the plate 19.

The load beam 21 consists of a rigid part 25 and a resilient part 27. The resilient part 27 is made of the resilient material 29A that is independent of the rigid part 25. A first side 29a of the resilient material 29A is laid on an end 25a of the rigid part 25 and is joined thereto. A second side 29b of the resilient material 29A is joined to the plate 19.

Accordingly, the second embodiment provides the same effects as those of the first embodiment.

When installing the flexure 22, the fixing pieces 59A are set in the second cut 39A and are laid on the end 19a of the plate 19, so that the tips 59Ab of the fixing pieces 59A are restricted and positioned by the second cut 39A. Consequently, the flexure 22 is installed easily.

According to the second embodiment, the second cut 39A is wide to contain the fixing pieces 59A, so that the fixing pieces 59A may not protrude from the resilient material 29A. Even when the disks 15 are rotated at high speed, the head suspension 11A is hardly affected by air disturbance, and the flexure 22 and load beam 21 are prevented from fluttering.

According to the second embodiment, it is not necessary to bend the fixing pieces 59A, and therefore, it is easy to manufacture them. Consequently, it is easy to manufacture the head suspension 11A.

(Third Embodiment)

Figure 10:
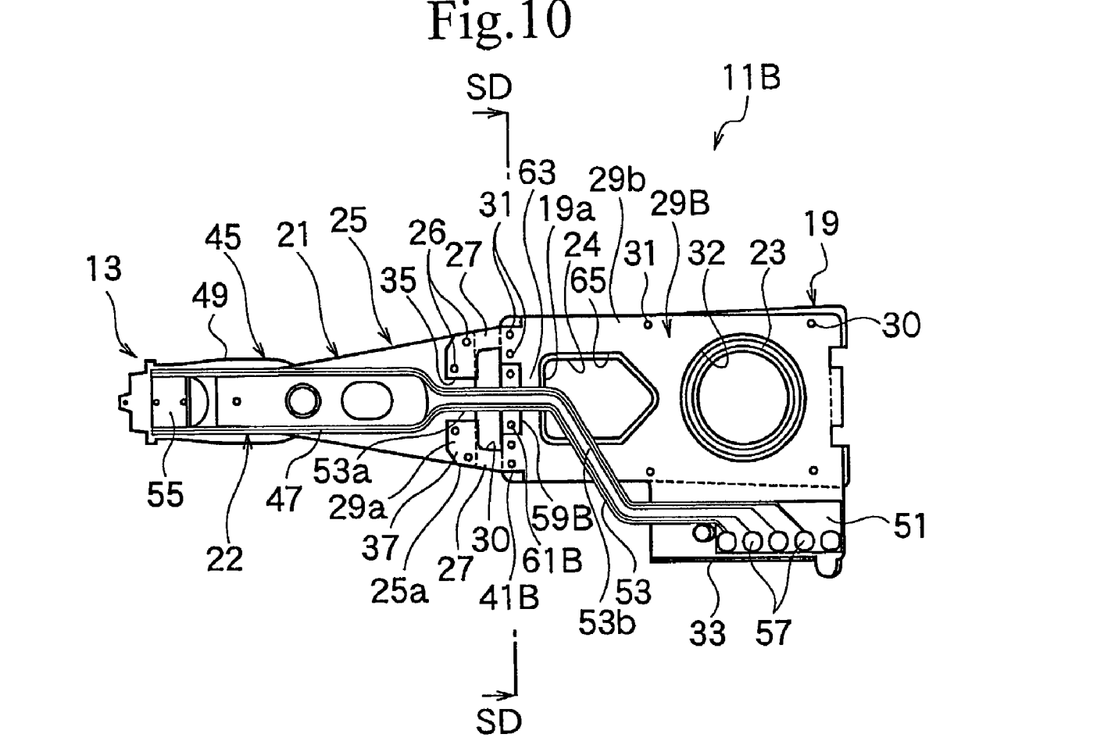
FIG. 10 is a plan view showing a head suspension according to a third embodiment of the present invention seen from a flexure side.
Figure 11:
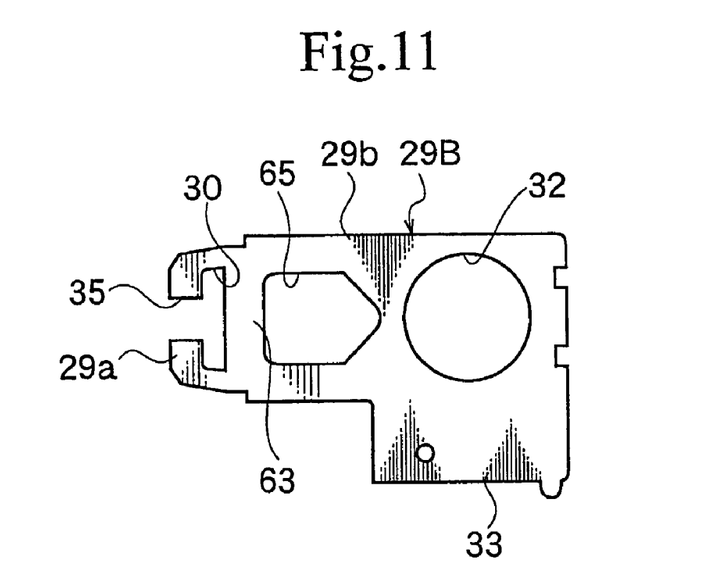
FIG. 11 is a plan view showing a resilient material according to the third embodiment.
Figure 12:
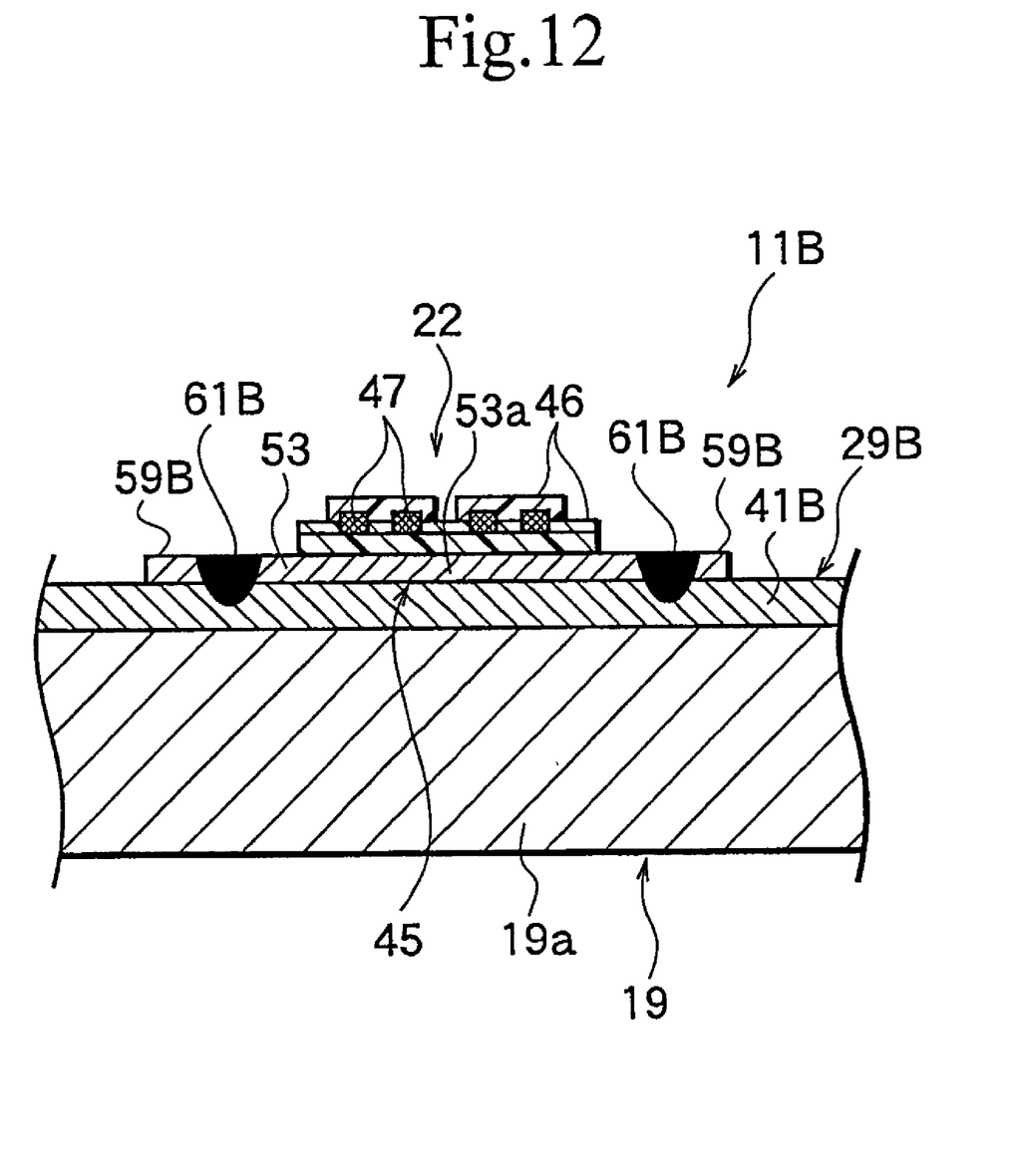
FIG. 12 is a sectional view taken along a line SD—SD of FIG. 10.

FIG. 10 is a plan view showing a head suspension 11B according to the third embodiment of the present invention seen from a flexure side, FIG. 11 is a plan view showing a resilient material 29B according to the third embodiment, and FIG. 12 is a sectional view taken along a line SD—SD of FIG. 10. The third embodiment is basically the same as the first embodiment, and therefore, parts corresponding to those of the first embodiment are represented with like reference numerals.

According to the third embodiment, the resilient material 29B has a continuous part 63 instead of the second cuts 39 and 39A of the first and second embodiments. Adjacent to the continuous part 63, there is a through hole 65 corresponding to a window 24 of a plate 19. Fixing pieces 59B flatly protrude from a metal base 45 of a flexure 22 and are tightly attached to the continuous part 63 of the resilient material 29B. In FIG. 10, the fixing pieces 59B are fixed to the continuous part 63 by, for example, welding (such as laser welding) 61B or bonding.

Like the first embodiment, the flexure 22 has the fixing pieces 59B. The fixing pieces 59B of the third embodiment are fixed to the continuous part 63 of the resilient material 29B adjacent to an end 19a of the plate 19.

The fixing piece 59B is formed on each longitudinal side of the flexure 22.

The flexure 22 is linearly extended along a longitudinal center line of a load beam 21 toward the end 19a of the plate 19.

The load beam 21 consists of a rigid part 25 and a resilient part 27. The resilient part 27 is made of the resilient material 29B that is independent of the rigid part 25. A first side 29a of the resilient material 29B is laid on an end 25a of the rigid part 25 and is joined thereto. A second side 29b of the resilient material 29B is joined to the plate 19.

Accordingly, the third embodiment provides the same effects as those of the first embodiment.

The third embodiment employs no second cut, and therefore, the fixing pieces 59B and a linear part 53a of the flexure 22 ride on an overlapping part 41B. Even under such a riding state, the fixing pieces 59B of the flexure 22 are fixed to the resilient material 29B in the vicinity of the end 19a of the plate 19. Namely, the flexure 22 is fixed as close to the resilient part 27 as possible. As a result, the flexure 22 is synchronized with the movement of the resilient part 27, to surely suppress the fluttering of the flexure 22.

(Fourth Embodiment)

Figure 13:
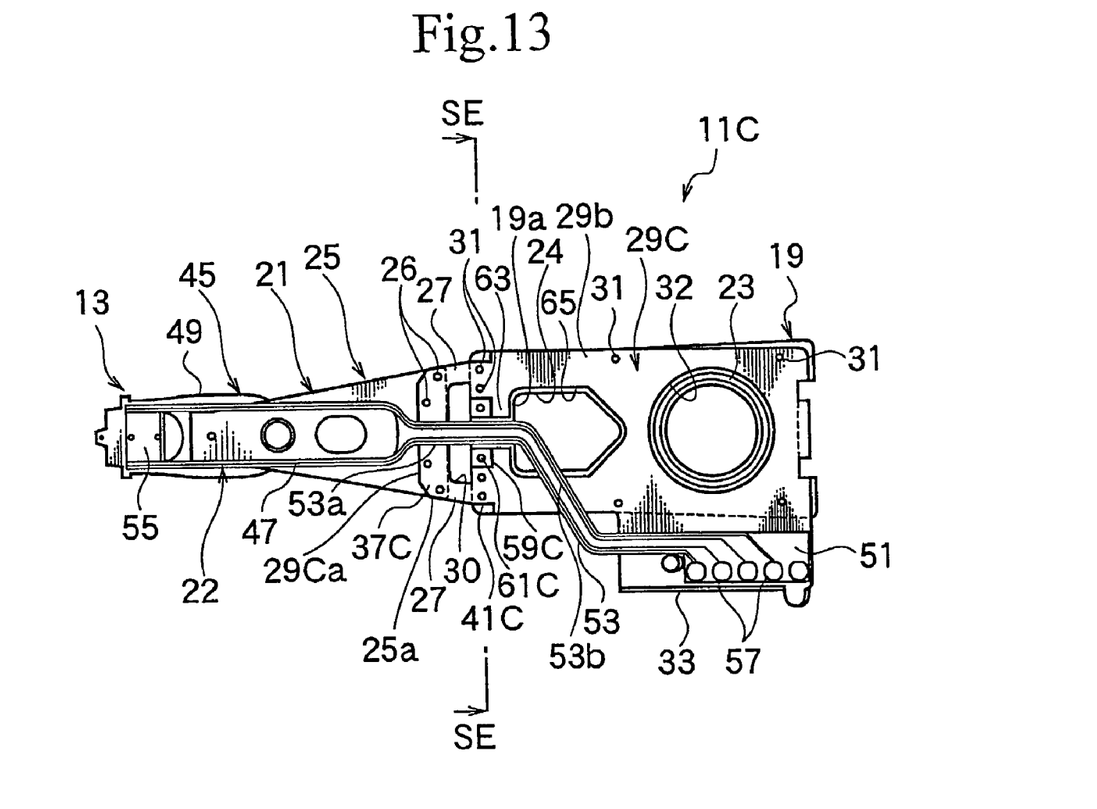
FIG. 13 is a plan view showing a head suspension according to a fourth embodiment of the present invention seen from a flexure side.
Figure 14:
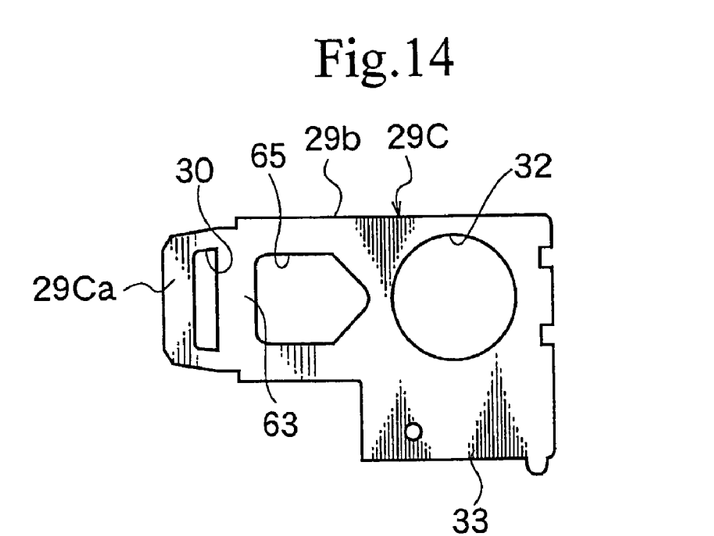
FIG. 14 is a plan view showing a resilient material according to the fourth embodiment.

FIG. 13 is a plan view showing a head suspension 11C according to the fourth embodiment of the present invention seen from a flexure side and FIG. 14 is a plan view showing a resilient material 29C according to the fourth embodiment. The fourth embodiment is basically the same as the first embodiment, and therefore, parts corresponding to those of the first embodiment are represented with like reference numerals.

According to the fourth embodiment, the resilient material 29C has no first cut 35 of the first and second embodiments. Namely, the resilient material 29C has a continuous end 29Ca. In addition, the resilient material 29C has no second cut 39 or 39A of the first and second embodiments. Namely, the resilient material 29C has a continuous part 63. Adjacent to the continuous part 63, the resilient material 29C has a through hole 65 corresponding to a window 24 of a plate 19. A flexure 22 of the head suspension 11C has fixing pieces 59C, which flatly protrude from a metal base 45 of the flexure 22. The fixing pieces 59C are fixed to the continuous part 63 of the resilient material 29C by, for example, welding (such as laser welding) 61C or bonding as shown in FIG. 13.

In this way, the fourth embodiment provides the flexure 22 with the fixing pieces 59C and fixes them to the continuous part 63 of the resilient material 29C in the vicinity of an end 19a of the plate 19.

The fixing piece 59C is formed on each longitudinal side of the flexure 22.

The flexure 22 is linearly extended along a longitudinal center line of a load beam 21 toward the end 19a of the plate 19.

The load beam 21 consists of a rigid part 25 and a resilient part 27. The resilient part 27 is made of the resilient material 29C that is independent of the rigid part 25. A first side 29Ca of the resilient material 29C is laid on an end 25a of the rigid part 25 and is joined thereto. A second side 29b of the resilient material 29C is joined to the plate 19.

Accordingly, the fourth embodiment provides the same effects as those of the first embodiment.

The fourth embodiment employs no first cut or second cut, and therefore, the flexure 22 rides on overlapping parts 37C and 41C at a linear part 53a of the flexure 22 and at the fixing pieces 59C. Even under such riding states, the fixing pieces 59C of the flexure 22 are fixed to the resilient material 29C in the vicinity of the end 19a of the plate 19. Namely, the flexure 22 is fixed as close to the resilient part 27 as possible. As a result, the flexure 22 is synchronized with the movement of the resilient part 27, to surely suppress the fluttering of the flexure 22.

Since the fixing pieces 59C of the flexure 22 are fixed adjacent to the end 19a of the plate 19, the fluttering of the flexure 22 is surely suppressed even if air penetrates between the flexure 22 and the rigid part 25, resilient material 29C, and plate 19.

Figure 15:
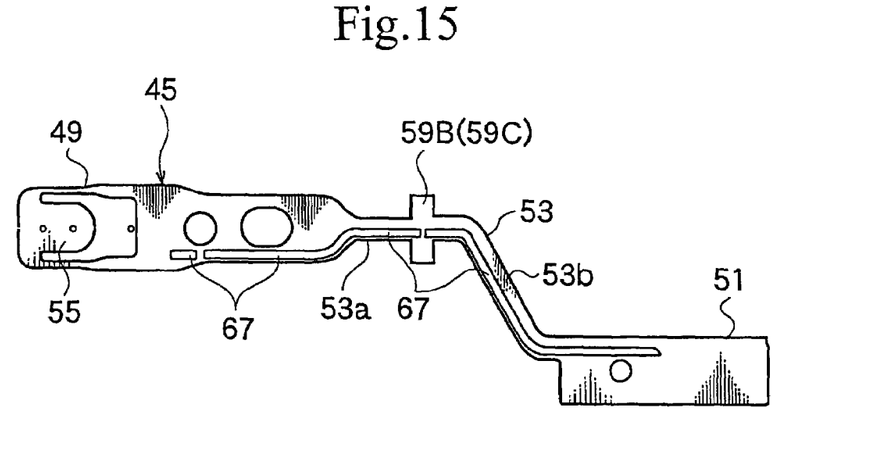
FIG. 15 is a plan view showing a metal base of a flexure applicable to the head suspension of any one of the embodiments.
Figure 16:
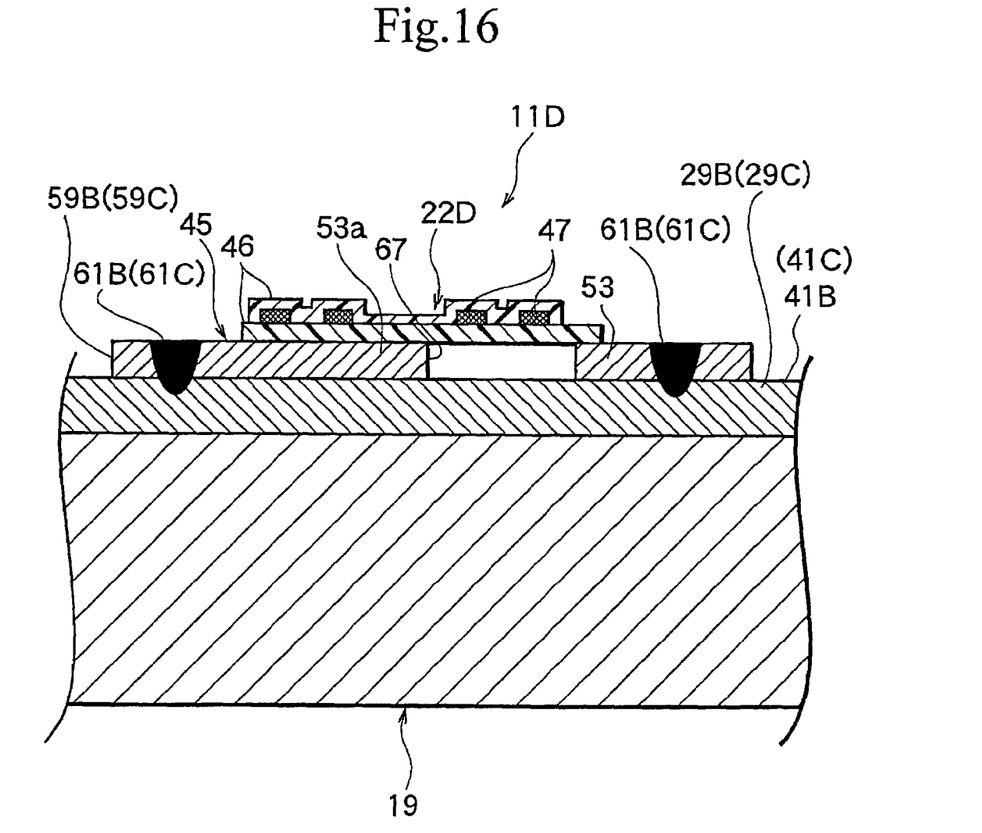
FIG. 16 is a sectional view showing a head suspension employing the metal base of FIG. 15, corresponding to a sectional view taken along the line SD—SD of FIG. 10 or a line SE—SE of FIG. 13.

FIG. 15 is a plan view showing a metal base 45 of a flexure 22D applicable to any one of the above-mentioned embodiments and FIG. 16 is a sectional view showing a head suspension 11D employing the metal base 45 of FIG. 15. FIG. 16 corresponds to a sectional view taken along the line SD—SD of FIG. 10 or a line SE—SE of FIG. 13. The metal base 45 of FIG. 15 has through slits 67.

The slits 67 are formed by partly removing the metal base 45 under a conductive path 47 of the flexure 22D, to improve electric characteristics. Namely, the slits 67 reduce electric capacitance between the conductive path 47 and the metal base 45, thereby increasing an electric resonance frequency. The slits 67 also function to realize electric alignment with respect to flexible cables or ICs connected to the head suspension 11D or a head 13 of the head suspension 11D, thereby correctly transmitting signals.

Under the slits 67, there are other metal layers such as the plate 19 that also produces electric capacitance. If the distance between the flexure 22 and the plate 19 changes, electric capacitance between them also changes, to vary electric characteristics and spoil the function of the slits 67.

To cope with this problem, the fixing pieces 59B or 59C of FIGS. 10 and 13 are employed to surely fix the flexure 22D, to synchronize the flexure 22D with the movement of the resilient part 27 and avoid the influence of air disturbance. The fixing pieces suppress the fluttering of the flexure 22D, to prevent variations in the distances between the flexure 22D and other metal layers such as the plate 19, thereby ensuring the electric-characteristic-improving function of the slits 67. This structure is applicable to the first and second embodiments.

In any one of the above-mentioned embodiments, the opening 30, window 24, enlarged part 43, hole 65, and fixing pieces 59, 59A, 59B, and 59C may optionally be omitted.

The resilient materials 29, 29A, 29B, and 29C may be shortened, and the end 19a of the plate 19 may be fixed to the end of any one of the shortened resilient materials 29, 29A, 29B, and 29C. The plate 19 may be formed to serve as a carriage arm.

The linear part 53a of any one of the flexures 22 and 22D may be shifted to one side in a width direction of the resilient material 29, 29A, 29B, or 29C at the first cut 35, and the second cut 39 or 39A may be shifted to the one side of the resilient material 29 or 29A.

What is claimed is:

1. A head suspension for a disk drive, comprising:
a plate attached to a carriage and turned around a spindle;
a load beam having a rigid part and a resilient part and supported by the plate with the resilient part adjoining an end of the plate opposing the rigid part, to apply load on a slider arranged at a front end of the load beam;
a flexure having a head to write and read data to and from a hard disk and a conductive path to transmit write and read signals to and from the head, the flexure being attached to the load beam and extended toward the plate; and
a fixing piece formed on the flexure,
the fixing piece being fixed to the plate at a medial portion of the end of the plate.

2. The head suspension for a disk drive of claim 1, wherein:
the flexure is linearly extended from the load beam at least to the end of the plate along a longitudinal center line of the load beam.

3. The head suspension for a disk drive of claim 2, wherein:
the resilient part of the load beam is made of a resilient material that is independent of the rigid part; and
a first side of the resilient material is laid on an end of the rigid part and is joined thereto, and a second side of the resilient material is joined to the plate.

4. The head suspension for a disk drive of claim 1, wherein:
the resilient part of the load beam is made of a resilient material that is independent of the rigid part; and
a first side of the resilient material is laid on an end of the rigid part and is joined thereto, and a second side of the resilient material is joined to the plate.

5. A head suspension for a disk drive, comprising:
a plate attached to a carriage and turned around a spindle;
a load beam having a rigid part and a resilient part and supported by the plate with the resilient part adjoining an end of the plate, to apply load on a slider arranged at a front end of the load beam;
a flexure having a head to write and read data to and from a hard disk and a conductive path to transmit write and read signals to and from the head, the flexure being attached to the load beam and extended toward the plate;
a fixing piece formed on the flexure, the fixing piece being fixed to the plate at the end of the plate; and
the fixing piece being formed on each longitudinal side of the flexure.

6. The head suspension for a disk drive of claim 5, wherein:
the flexure is linearly extended from the load beam at least to the end of the plate along a longitudinal center line of the load beam.

7. The head suspension for a disk drive of claim 5, wherein:
the resilient part of the load beam is made of a resilient material that is independent of the rigid part; and
a first side of the resilient material is laid on an end of the rigid part and is joined thereto, and a second side of the resilient material is joined to the plate.

\* \* \* \* \*